Figure 2:
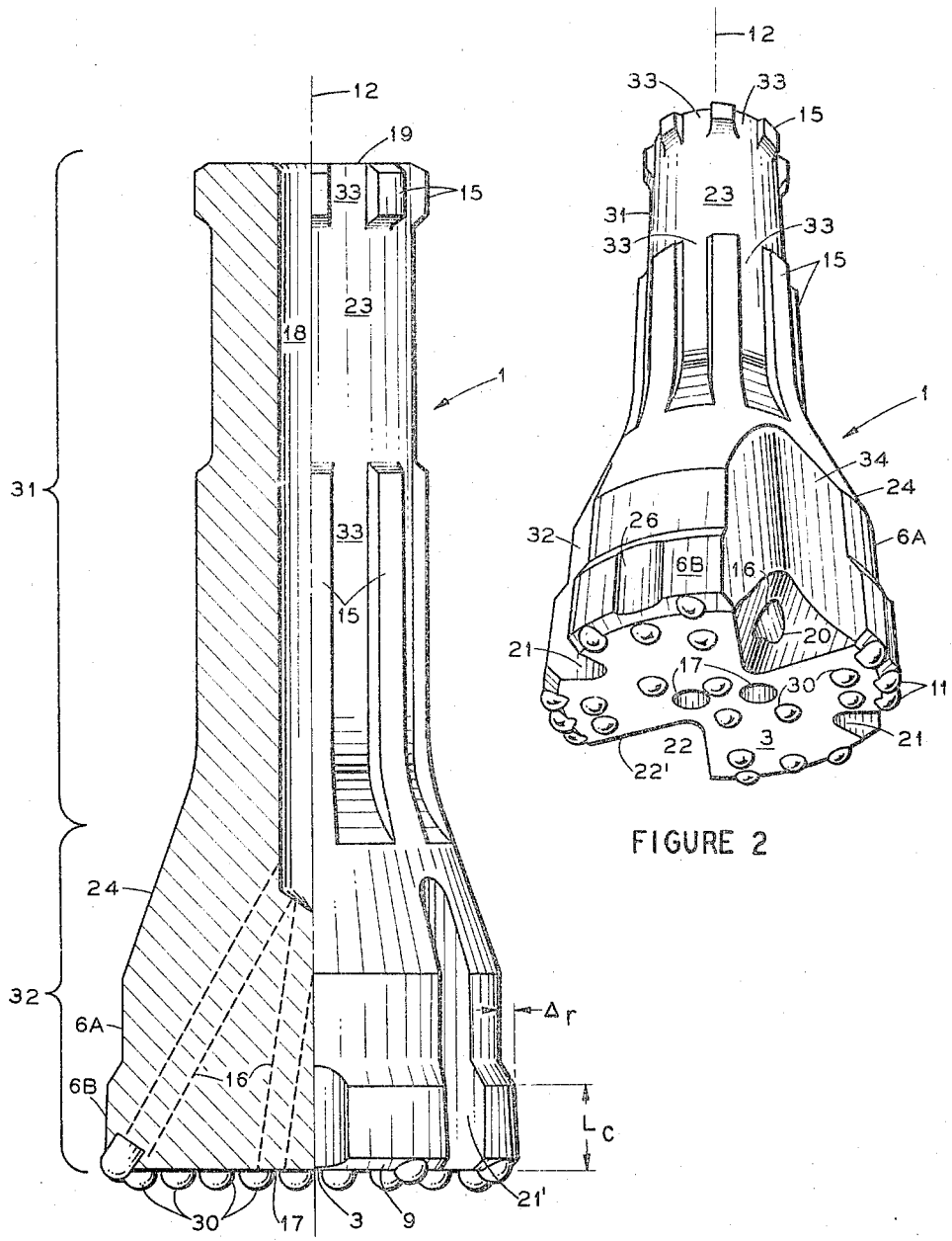

JOSEPH L. KELLY, JR.
INVENTOR.

BY *Roy V. Smith, Jr.*

ATTORNEY

Aug. 30, 1966   J. L. KELLY, JR   3,269,470
ROTARY-PERCUSSION DRILL BIT WITH
ANTI-WEDGING GAGE STRUCTURE
Filed Nov. 15, 1965                    3 Sheets-Sheet 2

JOSEPH L. KELLY, JR.
INVENTOR.

BY Roy V. Smith, Jr.

ATTORNEY

Aug. 30, 1966

J. L. KELLY, JR  
ROTARY-PERCUSSION DRILL BIT WITH  
ANTI-WEDGING GAGE STRUCTURE 3,269,470

Filed Nov. 15, 1965

3 Sheets-Sheet 3

JOSEPH L. KELLY, JR.  
INVENTOR.

BY Roy V. Smith Jr.

ATTORNEY

United States Patent Office 3,269,470
Patented August 30, 1966

3,269,470
ROTARY-PERCUSSION DRILL BIT WITH ANTI-WEDGING GAGE STRUCTURE
Joseph L. Kelly, Jr., Dallas, Tex., assignor to Hughes Tool Company, Houston, Tex., a corporation of Delaware
Filed Nov. 15, 1965, Ser. No. 514,739
8 Claims. (Cl. 175—410)

The present invention lies in the field of percussion bits, more particularly percussion bits utilizing cutting structure in the form of inserts of hard, wear resistant material such as tungsten carbide. The present application is a continuation-in-part of application 396,185, filed September 14, 1964, now abandoned, which in turn is a continuation-in-part of application 252,794, filed January 21, 1963, now United States Patent 3,185,228. Both the patent and the present application are concerned with the problem of preventing the peripheral surface of a bit from wearing into a "wedging" condition, this being a condition in which the bit body has worn flush with the sidewall of the hole being drilled to such an extent that it is difficult to rotate the bit without stalling the driving equipment.

Percussion drilling is a technique of old origin. Use of this method is widespread, but perhaps most important is its application to the drilling of blast holes in mining and quarrying. Numerous holes are drilled in the earth formation, and explosive charges are placed in these holes. Detonation of the explosive breaks up the formation into pieces of manageable size which can be readily removed for further crushing.

Portable earth boring machines capable of rotating a drilling bit are commonly used. A percussion tool capable of exerting several hundred blows per minute is placed either at the top of the drill string or is inserted just above the bit, and is typically actuated by the fluid circulated through the drill pipe. The forces and stresses transferred to the bit are extremely large. Many attempts have been made to invent a drilling tool capable of withstanding these severe operating conditions. Some have succeeded commercially, but the need for a better drilling device continues in order to lower the cost of this important mining method.

A popular bit type used in the percussion drilling of blast holes is known as a "crosshead" or "Carset" bit. This bit has a cutting structure of massive inserts of tungsten carbide extending radially from a point proximate the axis of rotation of the bit to its periphery, such pieces typically having a "doghouse" shape, i.e., a cross section having a rectangular base and a protruding triangular portion which converges downwardly to a chisel-shaped cutting edge. These pieces are brazed into slots on the lower face of the bit, and are sharpened at the lowest extremity. Such devices have been commercially successful in recent years, but have definite limitations.

For example, the provision of radial cutting members extending like spokes from a point proximate the center of rotation of the bit to the gage is undesirable because it ignores the fact that the work expended per unit volume of rock removed is much greater near the wall of the hole than it is near the center. As the crosshead bit has the same amount of cutting structure at the outer and inner diameters, it necessarily wears faster at the outer diameter because of the higher peripheral speeds, larger volume of rock removed, and larger work required per unit volume of rock removed. Frequent sharpenings are required to maintain an economical penetration rate, and also to avoid breakage of the cutting elements.

The problem of cutting element breakage is related to changes in load distribution resulting from wear. The cutting elements of the crosshead bit are made of a wear resistant, hard and brittle material, usually tungsten carbide. Such materials have poor resistance to bending. Because of their disposition in the bit, the cutting elements are equivalent to beams resting on an elastic foundation (the more resilient metal of the bit body). The uneven load distribution across the bottom of the hole creates bending stresses in the cutting elements. The load on the cutting elements increases as their cutting edges dull and it becomes more difficult to drive them into the formation. The greatest increase occurs near the wall of the hole where the bit dulls most rapidly. Eventually, the resulting increase in bending stresses can become large enough to produce transverse fracture.

To alleviate this problem (and also to maintain an economical penetration rate), sharpening of the cutting elements is periodically required—at a considerable expense. For example, in one quarry, where the bits drill 450 to 500 feet, 20 to 25 sharpenings are required at a cost of approximately $3.00 each. This is a serious detriment to economic drilling.

Time consuming and costly sharpening is also required to eliminate another wear problem. The above described tungsten carbide inserts of the prior art are initially relatively sharp at the outer diameter, and extend upwardly and inwardly with a slight tapr. This provides some clearance between the wall of the hole and the carbide extending up on the side of the bit. As the bit wears, however, a large radius begins to form at the lower, outer corners of the inserts. This process continues until the inserts are worn to a taper extending upwardly and outwardly. Thus, a slightly conical shape is formed in the earth formation, tending to wedge the bit. The penetration rate decreases due to the increase in axial force and torque requirements needed to drive and turn the bit in this wedge, and the lateral forces developed are often adequate to fracture the carbide blades. Sharpening or replacement is eventually necessary to recoup the lost penetration rate and avoid carbide breakage.

The primary object of the present invention is to provide an insert type percussion bit adapted for long service without the need for such sharpenings and without wearing into a wedging condition. Expressed in other words, the object is to furnish a percussion bit which is self-sharpening throughout its long service life and will not become stuck in the hole being drilled or materially increase the horsepower required to operate it, even after severe wear. Another object is to furnish such a bit which is capable of withstanding the severe, fluctuating forces encountered in the rotary-percussion drilling of blast holes, water wells, foundation holes, and the like. Another object is to provide a cutting structure which will maintain substantially the initial penetration rate even when dull, and thereby eliminate the necessity for frequent and expensive sharpenings. A further object is to increase the efficiency of energy transfer by using small inserts of hard, wear resistant material disposed in the relatively elastic body metal. Another object is to avoid the long-standing wedging effect of dulling at gage. Still another object is to effectuate faster removal of the cuttings from the bottom of the hole by optimum use of the fluid circulated through the drill pipe and the bit. A still further object is to use the abrasive laden fluid flowing across bottom to maintain a large insert protrusion by wearing away the body metal as fast as the protruding inserts are worn away in cutting the earth formation. Another object similar to the last named is to provide a bit adapted to cut the hole bottom adjacent the sidewall so that the body material in and above that area and the cutting structure thereat wear in such manner as not to assume a wedging configuration, i.e., a peripheral surface tapering downwardly and inwardly. Yet another object is to furnish a bit which will drill deep holes while supporting the weight of the drill string without premature breakage and wear of the cutting structure which operates at the juncture of the sidewall and bottom of the hole. And yet another object is to provide a bit in which the surface confronting the sidewall of the hole will not wear prematurely even though the bit is operating in loose or falling rock or such surface is otherwise exposed to a highly erosive atmosphere.

These and other objects are accomplished primarily by utilizing as cutting structure a multiplicity of small inserts of hard, wear resistant material, preferably sintered tungsten carbide. As in the aforementioned patent, these inserts are divided into an inner group and an outer or heel group, the inner group of inserts having their bases secured in the bit body above their projecting cutting tips and the heel group being inclined with respect to the axis so that their cutting tips protrude from the body at about the intersection of the bottom and peripheral surfaces of the body and their bases are buried in the body in spaced relationship to both such surfaces. Except for special drilling conditions the peripheral surface of the body is kept free of inserts and other wear resistant material to encourage it to wear inwardly at about the same rate of radial wear as is experienced by the heel inserts, and the extent of peripheral surface coming into abrasive contact with the wall of the hole is limited by initially shaping the body to have a stepped configuration. The lowermost part of the body, which contains the holes or sockets for the inserts, must extend radially outwardly about as far as the cutting tips of the heel inserts in order to furnish adequate support for the heel inserts, and for the same reason this lowermost part should preferably extend a reasonable distance parallel to the bit axis, e.g., about the length of a heel insert. By terminating this lowermost portion at an inwardly extending shoulder above such minimum length and by providing an adequate number of axially extending slots and grooves below such shoulder between heel inserts, the surface area of the bit body coming into abrasive contact with the sidewall is limited to a value which will keep the bit from binding in the hole after any initial upward taper has been lost and the lowermost step has worn to a cylindrical shape. In an alternate form of the invention there are no particular steps in the lowermost part of the bit body but the same effect is obtained by using a large number of slots and grooves, or other means of relief.

While it is difficult to state maximum feasible dimensions for the infinitely large number of drilling conditions that may be encountered—types of rock, depth of hole, condition of hole as respects likelihood of material sloughing into it from above the bit, capacity of drilling equipment used to operate the bit, etc., it is feasible to state such dimensions in terms of a limited number of actual field tests and the most adverse conditions which can be expected. On this basis and assuming operating equipment which is adequate for a new, undulled bit, the maximum surface area of the lowermost step should not be greater than $ndD$, where $n$ is the number of heel inserts, $d$ is the diameter or average cross-sectional dimension of a heel insert, and $D$ is the bit diameter. Preferably the axial length of the lowermost surface is less than $D/3$ while the net circumference of the surface, i.e., the part of the circumference remaining after deducting all slots, grooves and other indentations, is preferably not greater than $3nd$, but any combination of axial and circumferential limits may be used which keeps the surface area below the specified maximum, e.g., the axial dimension may have no upper limit when the invention takes the form of a stepless bit body and the circumference of the body is reduced by a large number of grooves, slots and other indentations.

Figure 1:
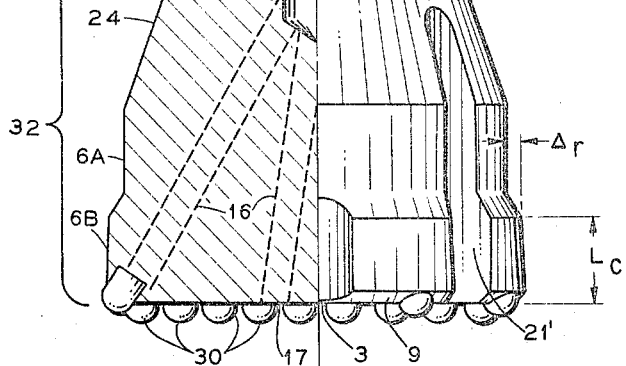
Figure 3:
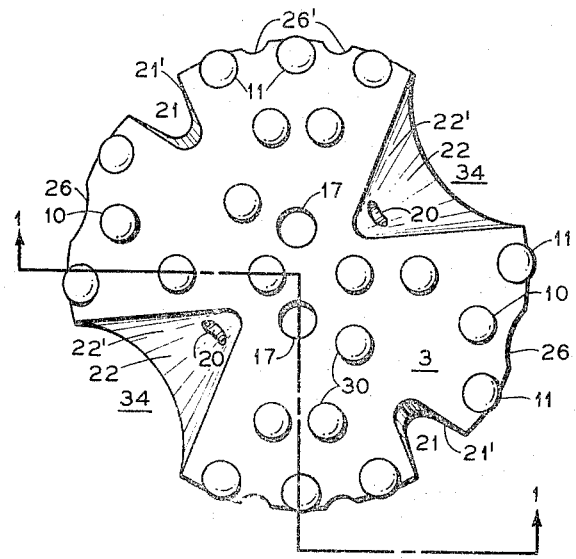
Figure 4:
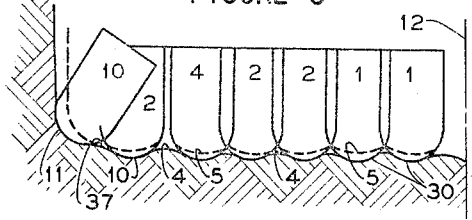
Figure 7:
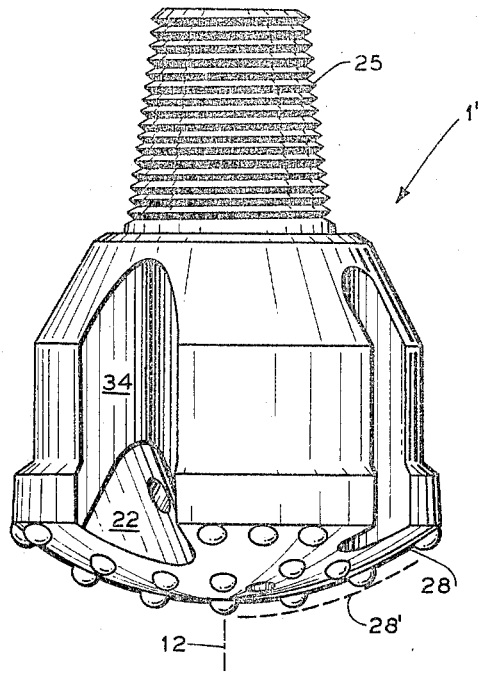
Figure 5:
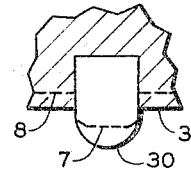
Figure 5A:
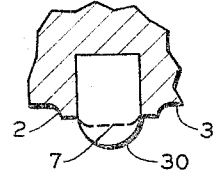
Figure 6:
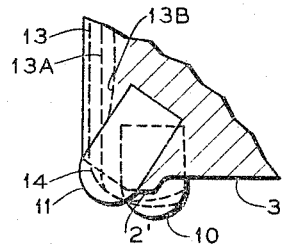
Figure 7A:
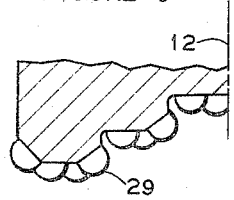
Figure 7B:
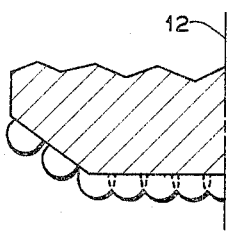
Figure 7C:
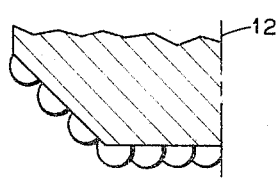
Figure 7D:
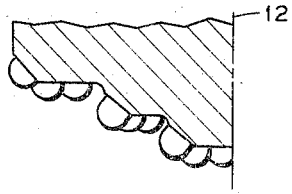
Figure 7E:
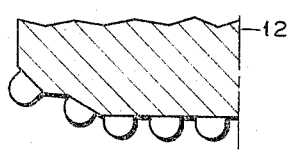
Figure 8:
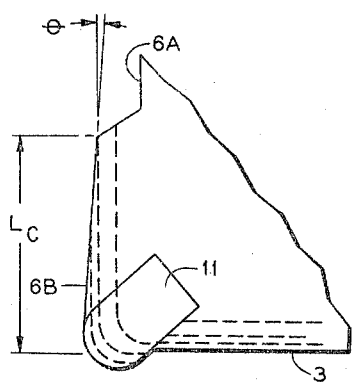
Figure 9:
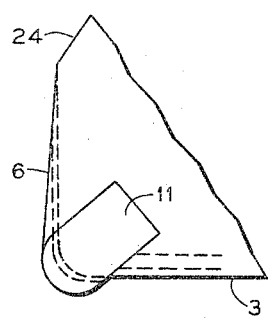
Figure 9A:
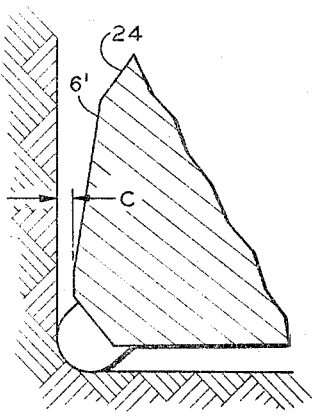
Figure 10:
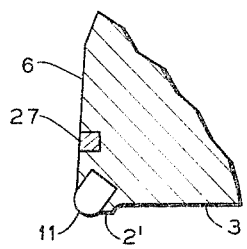
Figure 10A:
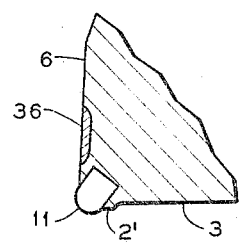
Figure 11:
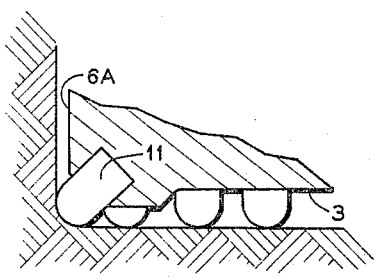

This improvement will become more clear to the reader by considering the following description together with the attached drawing, in which drawing:

FIGURE 1 is a side elevation view, half in section, showing one preferred embodiment of the invention, as seen in looking in the direction of the arrows 1—1 of FIGURE 3, FIGURE 2 is a view in perspective of such preferred embodiment showing with more clarity some of the external structural details, FIGURE 3 is a bottom view of the (preferred) embodiment of FIGURES 1 and 2 indicating the location of wear resistant inserts and other structural details of the bottom portion of the bit, FIGURE 4 is a side elevation view of the bottom of the hole in half section with the wear resistant inserts on all rows rotated into the plane of the paper, showing the pattern the inserts make in the bottom of the hole and the wear pattern of the inserts in the preferred embodiment of the invention, FIGURE 5 is a side elevation view of one form of insert with its supporting body metal in fragmentary section, FIGURE 5A is similar to FIGURE 5 but shows an insert mounted in a supporting boss, FIGURE 6 is a side elevation view of a heel insert, together with an insert of the adjacent row rotated into the plane of the paper. The supporting body metal is shown in fragmentary section. Both the initial positions and the wear patterns of inserts and body metal are illustrated, FIGURE 7 is another side elevation view showing a second embodiment with a threaded connector at the upper end and with a convex lower end, FIGURE 7A through 7E are fragmentary longitudinal sections illustrating alternate configurations of the lower end of the bit, FIGURE 8 is a fragmentary longitudinal section showing one of the heel inserts of the FIGURE 1 embodiment as mounted in the bit, together with a portion of the steel which supports such insert and defines the outer periphery which wears against the sidewall of the hole being drilled, the full lines showing the unused condition while three sets of dashed lines show two successive conditions of wear, FIGURES 9 and 9A show a heel insert and a supporting metal configuration similar to those of the FIGURE 8 set but differing therefrom in lacking the lower step 6B of the preferred embodiment, FIGURE 9A also showing heel inserts projecting outwardly past the gage surface, FIGURES 10 and 10A illustrate a bit modified to protect the gage surface of a bit against abrasion, and FIGURE 11 is a corner detail of a bit in which the heel inserts do not trail the inner rows.

In describing the preferred embodiment of the invention illustrated in the drawing, specific terminology will be resorted to for the sake of clarity. The invention is not intended, however, to be limited to the specific terms, but should include all technical equivalents which operate in a similar manner to accomplish a similar purpose.

Turning now to the preferred embodiment selected for illustration in the drawings, numeral 1 designates the bit as a whole, consisting of an upper shank portion 31, and a lower body portion 32 integral with such shank. At the top of shank portion 31, horizontal end surface 19 serves as an anvil whereon the severe, fluctuating, axial forces provided by the impact or percussion tool (not shown) are delivered to the bit. The outer surface of shank portion 31 is machined to provide splines 15 and intermediate grooves 33 parallel to the longitudinal axis 12 of the bit, such splines and grooves extending to top surface 19. These elements engage matching splines and grooves in the lower end of the percussion tool, and are used to transmit the circumferential forces which rotate the bit. A wide circumferential groove 23 is machined below the upper end of the bit 19 to form an annular space between the bit body and the percussion tool. A split ring (not shown) is inserted therein to retain the bit on the percussion tool.

Body portion 32 and shank portion 31 are actually a single massive piece of steel, and it is to be understood that the designations employed are used merely for their convenience in discussing the various functions of the bit 1, its manner of cooperation with the percussion tool and its manner of penetrating the formation being drilled. While the body portion may be thought of as providing support for the cutting elements and as providing the bulk of the mass of the bit, and the shank portion as furnishing the means for transmitting impacts and rotation to the body portion, it is apparent that the shank itself must be sufficiently strong to withstand the blows delivered by the impact tool. In FIGURE 1, these two portions are illustrated as smoothly joined through the conical section 24.

The body portion 32 is substantially a solid cylinder having a stepped outer surface 6 of a diameter which increases downwardly from a minimum diameter in conical portion 24 to an intermediate diameter in cylindrical (or near cylindrical) portion 6A and a maximum diameter in bottom portion 6B.

Such outer surface is preferably a surface of revolution defined by rotating the section described about the longitudinal axis 12 of the bit, except as relieved by the various openings to be described. In the preferred embodiment of FIGURES 1–6, the bottom of the bit is defined by lower surface 3 of the body portion, preferably normal to longitudinal axis 12. This lower surface 3 intersects side surface 6 at its outer periphery, and such intersection is slightly chamfered as at 9 to provide a space for the protruding ends of the heel row inserts 11.

Cuttings formed by the action of bit 1 are removed by a fluid delivery system which includes a central passageway 18 in shank 31 having an upper end adapted to join a like passageway in the percussion tool and a lower end joining one or more passageways 16 in body 32 which extend through lower surface 3 at ports 17. Cuttings entrained by the flushing fluid are removed from the hole bottom and carried upwardly past body 32 through return passageways 21 and 22. These passageways may be formed either with vertical sides 21′ or with sidewalls 22′ flaring upwardly and outwardly from a point near the center of lower surface 3 to shallow recesses 34 in side surface 6, the combination of a pair of each type having worked quite satisfactorily for the 7-inch bit illustrated. Additional passageways 16 in bit body 32 may be provided to discharge through walls 22 at the ports 20 illustrated. Some cuttings also flow upwardly through slots 26 and 26′ between heel inserts 11, and over the heel inserts between the sidewall and surface 6.

The inserts shown are cylindrical compacts of hard, wear resistant material, preferably sintered tungsten carbide (sometimes called "cemented" tungsten carbide), such inserts being familiar to users of the rolling cone rotary bits introduced to the trade by the Hughes Tool Company and popularized under its trademark as "Hugheset" rock bits. While various shapes and sizes of such inserts may be used, the illustrated type, which have proven quite satisfactory in service, are cylinders having hemispherical cutting ends, an overall length slightly greater than the diameter, and diametral sizes of ¼ to ⅝ inch. They are most simply force fitted into holes drilled into the bit body.

The arrangement of inserts 30 across bottom is governed by their size, the space available, and the work required of the inserts at the various radii. The greatest work in fracturing rock is expended at the juncture of the wall and the bottom of the hole. Wear is also greater at this point due to the large distance traveled by the inserts. Large numbers of inserts are therefore required at this location. Hence, the heel row 11 of this particular embodiment has ten inserts for the illustrated seven-inch diameter bit. The adjacent inner circumferential row 10 requires only two inserts. The number of inserts per circumferential row decreases with decreasing radius until only one is required at the two innermost rows, as indicated by the numerals appearing in the upper right hand corners of the inserts 30 shown in FIGURE 4. This arrangement can be varied to accommodate the various formations. Other variations are required to accommodate the different sizes of bits used in rotary-percussion drilling. The compacts, for example, sometimes require optional support metal, as shown by boss 2 in FIGURE 5A. Such boss permits the use of large projections beyond surface 3, and at the same time provides adequate supporting structure. A similar boss or rib 2′ may be provided for heel inserts 11, as indicated in FIGURE 6.

The disposition of inserts is such that if rotated into one plane, as in FIGURE 4, there are upstanding rims or rings 4 of uncut bottom which are disintegrated by fracturing. The uncut bottom should not be too great, for if so, the formation will not fracture across these rings, and the rings will eventually come into contact with bottom surface and slow down or stop the bit. With the inserts disposed to fracture across some uncut bottom, the wear pattern of inserts 30 is as shown by numeral 5 in FIGURE 4.

The individual compacts wear to a generally flat shape 7, as shown in phantom in FIGURE 5. Quite unexpectedly, the penetration rate does not decrease much from the initial rate even when the inserts are thus dulled flat. In percussion drilling it is generally agreed the drilling rate is proportional to the energy delivered to the bit as long as the force developed is large enough to produce failure of the rock being drilled. Field tests using the preferred embodiment described above with conventional percussion tools have shown, quite unexpectedly, that the penetration rate decreases very little as the insert shape wears from spherical to flat. For this reason, the inserts could initially be flat as numeral 7 indicates in FIGURE 5, or have any other blunt termination. The preferred spherical surface is thought best, however, because there are no stress raising sharp corners which cause the inserts to fracture. Also, the spherical ends may aid in localizing the stress in the rock, because there is some, but amazingly small, decrease in penetration rate when the inserts dull.

Another result flowing from the structure described which is believed to be unobvious and unexpected is the elimination of wedging at the outer and lower edge of the bit. As previously indicated, prior art bits require sharpening after not too extensive periods of use because either the gage surface (side surface 6 of bit body just above the heel cutting structure) or the cutting structure, or both, become worn into a wedging configuration, i.e., a taper extending down and in from side surface to lower surface or a rounded corner joining such surfaces, or simply wear to a cylindrical surface of quite large area. Where prior art attempts to avoid such wear-induced configurations have been directed largely to increasing the wear resistance of the side surface 6, the present invention embodies the completely opposite concept of decreasing the wear resistance of such surface so that it wears at least as fast as the portions of the inserts of heel row 11 contacting the sidewall of the hole, and the concept of minimizing such gage surface area throughout the life of the bit.

The class of service for which the bits of the invention are employed does not have stringent requirements for the gage of the hole drilled, unlike oil well drilling, and all such holes decrease very gradually in diameter as bottom is approached, although in any short length of hole, e.g., that equal to the length of a bit, the taper is imperceptible. The problem lies in preventing the side surface of the bit from either wearing too slowly, so that it conforms to the shape of the hole (wedging configuration), or too rapidly, so that the heel inserts are deprived of needed support. The tendency to wedge arises in competent formations such as granite, traprock and limestone. Excessive abrasive wear occurs in incompetent or broken rocks where the bit is continually enveloped in cuttings. Drilling of overburden and waste in open pit mining is typical of the condition.

The ideal structure to prevent the gage surface of the bit from slowly wearing into a wedging condition or configuration during both an initial period of use and a more advanced employment in a well consolidated formation would be one in which the only part of the bit touching the sidewall of the hole lies at the precise intersection of gage surface 6 and bottom surface 3, all parts of surface 6 above such intersection being recessed sufficiently far in toward the bit axis that the part of the bit contacting the sidewall never wears flush therewith and thus never exposes any gage surface to contact with the sidewall. This ideal is, of course, impossible of realization, because it implies only a line contact, and can be approximated only as limited by other considerations.

For one thing, heel inserts 11 require supporting metal between their sockets and the outer surface of the bit, a consideration dictating that such outer surface can not jut radially inwardly just above the protruding tip of the insert but must have a contour somewhat like that illustrated in the drawing. Another consideration is that the sidewall-contacting parts of the bit must have a surface rather than making just line contact, such surface in the present invention being those parts of the tips of heel inserts 11 which are initially tangent to the side of the hole and gradually wear parallel, plus the portion of the bit body which support such heel inserts. It is also appropriate to mention that there is a limit to the number of such heel inserts which can be provided in a bit of a given diameter, as too close a circumferential spacing results in thin metal sections which fracture in service and cause inserts to fall out before they are worn. As an instance, heel inserts of ½-inch diameter were spaced apart only ¾ inch between center lines in a nearly test bit of 7 inch diameter, and such bit failed by fracturing of the metal between heel inserts. These failures were eliminated when 9/16 inch inserts were spaced 1¼ inches between center lines. In general, the minimum spacing between heel inserts to avoid fracturing of the metal appears to be about 2 insert diameters (between center lines).

The outstanding advance in the percussion bit art achieved with bits of the present invention is the drilling of holes with footages and penetration rates equaling or exceeding those of prior art bits and without the wedging in the hole or the need for resharpening which characterizes the bits of the prior art. As heretofore indicated, the present invention utilizes for its cutting structure a multiplicity of elongated wear resistant inserts discretely spaced over and secured in a metal body so that their blunt cutting tips protrude from the bottom surface, the inserts inwardly from the peripheral (gage) surface of the bit body being generally parallel to the axis of the bit and those at the intersection of such surface with the bottom being disposed in holes which extend upwardly and inwardly from such intersection toward the axis of the bit. Such disposition of the heel inserts buries their inner ends in a body of metal and insures that they will have adequate support as the side and bottom surfaces of the body are worn. A disposition of the heel inserts parallel to the bit axis and with their bases initially tangent to the sidewall of the hole would not only permit premature loosening and falling out as the bit is used through only an initial period of wear, but would also permit wearing into a wedging configuration. (The initial wear would all be on the protruding tips of the heel inserts and the small parts of the cylindrical bases immediately adjacent the tips which touch both bottom and sidewall, but there would be no wear or only slight wear of the balance of the bases, thus causing a tapered shape to develop.)

The important structural features of the present invention which prevent the bits in which the invention is embodied from developing a wedging condition or configuration, even after exaggerated wear, are (1) using a composite of a relatively soft steel body and relatively wear resistant inserts in which the wear resistant material which comes into contact with the sidewall of the hole is concentrated at the intersection of the gage and bottom surfaces of the bit, the wear resistant material being minimized in the part of the gage surface above such intersection, and (2) minimizing the body gage surface area which contacts the sidewall by appropriate grooves, slots and steps. More specifically, feature 1 takes the form of using heel inserts 1 disposed at an angle so that their tips protrude at the intersection of the gage and bottom surfaces 6 and 3, and by eliminating (or not using) any inserts which protrude from the gage surface 6 above such intersection.

The second feature takes the form of an outer surface 6 reduced in surface area by the two pairs of return air courses 21 and 22, grooves 26 and 26', and the configuration and limited height of the lowermost step 6B of the gage surface. Grooves 26 are relatively shallow, as depicted in the drawing, and are gradually eliminated as surface 6 wears. Similarly, lowermost portion 6B of the gage surface is preferably tapered as shown, an angle $\theta$ of 3 degrees having been used, but such taper also gradually disappears as the gage surface wears into a cylindrical surface conforming to the shape of the hole. The important details remaining are $\Delta r$, the radial offset of intermediate section 6A relative to lower step 6B, the circumferential dimensions of the lower step and the return flow courses 21 and 22, and $L_c$, the axial dimension of the lower step. $\Delta r$ is somewhat arbitrary, of course, and is made sufficiently large to insure that surface 6B will not wear flush with surface 6A before the cutting structure is worn out.

It will be apparent that the maximum axial length $L_c$ of lower step 6B and the maximum net circumference of such step for which a bit of a given diameter will not stick in the hole will vary with many factors, and hence only examples of this dimension can be given. Before doing so, it should be mentioned that, in drilling well consolidated formations, in only isolated instances can any wear of surface 6 to a smaller diameter than at the heel of the bit be detected, as indicated by the wear pattern 13B of FIGURE 6. Such instances apparently are brought about by the eroding effect of upwardly flowing, cuttings-laden flushing fluid, but they are isolated and are not reproducible; the only important mechanism which wears surface 6 is frictional contact with the sidewall of the hole as the bit is rotated and driven downwardly, resulting in wear patterns like 13 and 13A of FIGURE 6.

The same 7-inch diameter bit of the preferred embodiment heretofore described was made with the ten heel inserts having a diameter of 9/16 inch and an overall length of 15/16 inch. Each of the pair of slots 21 had an outer circumference (circumferential interruption of surface 6B) of 1-inch, while each of the pair of grooves 22 had a similar outer circumference of 2.9-inches. The dimension $L_c$ was 1⅜-inches, the upper chamfer connecting 6B with 6A being at an angle of 30 degrees with the vertical while chamfered surface 9 made an angle of 33 degrees with surface 3, so that the initial net dimension of the nearly vertical main surface 6B was only 1⅛-inches.

A bit as thus fabricated was used in drilling 13.8 blast holes to an average depth of 50 feet for a total footage of 689 in gneiss rock with a percussion drill delivering approximately 1000 blows per minute each at about 390 ft.-lb. while rotating at 25 to 30 revolutions per minute. The penetration rate in the first hole was 17.9 feet/hour, and the average for the entire run was 17.1 feet/hour. This bit did not require any resharpening and never stuck in the hole. At the end of such service, the bit had worn to a diameter of 6 11/16-inches and the remaining portions of the heel inserts were broken off. The drilling cost for this bit was $1.57/foot. In the same quarry, the crosshead bits of the prior art average 520 feet at 12.2 feet/ hour, require resharpening over 20 feet, and cost about $2.31/foot (total drilling cost).

By contrast, a bit like that described except that surfaces 6A and 6B were combined into a single surface 6 as shown in FIGURE 9, such surface tapering from the vertical axis at an angle of 3 degrees, was tested in the same rock and under the same conditions. Such bit drilled 561 feet at an average rate of 16.6 ft./hr. and then wedged in the hole. At this point the bit diameter was 6⁴⁷⁄₆₄″ and one heel insert was broken. The reduced penetration rate resulting from increased friction between side surface 6 and the wall of the hole and the reduced total footage resulting from wedging raised the drilling cost with this bit to $1.75/foot, an increase of 10%. When this bit wedged, the length of side surface 6 contacting the wall of the hole was approximately 1¾-inch, indicating that $L_c$ must be somewhat less than 1¾-inches if the described bit is to be prevented from wedging.

A third bit tested in the same rock under the same conditions was identical to that described except that surfaces 6A and 6B were combined into a single surface 6′ as shown in FIGURE 9A, such surface tapering from the vertical axis at angle of 3 degrees and reduced in diameter to provide an initial minimum clearance $c$ of ³⁄₃₂-inch between said surface and the wall of the hole. Such bit drilled 546 feet at an average rate of 17.2 feet/hour and then wedged in the hole. At this point the bit diameter was 6⁴⁹⁄₆₄ inches and no heel inserts were broken. The initial clearance $c$ provided in this bit allowed it to maintain a penetration rate comparable to that of the preferred embodiment but did not prevent wedging. The result was a drilling cost of $1.71, an increase of 9% over that achieved with the preferred embodiment.

Another result obtained with the structure described is produced by the flow of flushing fluid and the cuttings it carries. As fluid exits from port or outlet 17, it becomes impregnated with abrasive particles from the formation, causing erosion of the bit bottom 3. This phenomenon is utilized to promote sustained, fast penetration rates. The inserts of the preferred embodiment initially projected about ⁹⁄₃₂ of an inch from the bit bottom surface 3. The inserts penetrate the earth formation only slightly during each revolution of the bit. Hence, there is a space by which the formation cuttings can escape from the bottom. As the inserts wear with use to phantom line 7 of FIGURE 5, for example, the projection of the insert would be expected to decrease. Since the cuttings cannot escape as easily through this smaller space, the penetration rate would be expected to decrease as the cuttings accumulated on the bottom. It was found, however, that the fluid laden with abrasive particles scours bottom surface 3 to prevent such an undesirable development. Such scouring is attributable to the fact that bit bottom 3 is formed parallel to the bottom of the hole over a substantial area, as shown in FIGURES 4 and 7, i.e., by making surface 6, 28, etc., a surface of revolution, and by the fact that the inserts 30 are disposed to protrude equally from the bottom. The abrasive particles in the fluid erode the bit bottom surface 3 to the phantom line indicated by numeral 8 in FIGURE 5 while the inserts are wearing to line 7, apparently aided by the fact that the fluid must flow through the small clearance between bit bottom 3 and the bottom of the hole at a high velocity. The initial projection of the inserts can thereby be maintained.

The preferred embodiment heretofore described in connection with FIGURES 1–6 utilizes a flat lower surface 3 on bit body 32. Other bottom or lower surface shapes are indicated in the bit 1′ of FIGURES 7 and 7A through 7E, which also show a shank in the form of a tapered threaded connector 25. FIGURE 7 indicates a convex lower surface 28 (convex downward) in which inserts may be disposed in the same general manner as described for the preferred embodiment to define a similarly shaped bit bottom 28′ and a concave hole bottom.

A lower bit surface which is concave downward (not shown) would have the advantage of keeping the bit rotating about its center-line on the core thus formed. The inwardly and upwardly stepped surface 29 of FIGURE 7A would serve the same purpose, and inwardly and downwardly stepped surfaces as in FIGURES 7B through 7E also appear feasible. Any such surface should preferably be a surface of revolution defined by rotation about bit axis 12 and have the inserts except at gage and other corners protruding normally from the surface approximately the same distance. It is also preferable to have the inserts at each outside corner of a step disposed at an angle, as in the case of heel inserts, as shown, to avoid premature loss.

The bits thus far described are intended for use in drilling through well consolidated (competent) formations with no sloughing into the hole and with a well established flow of drilling fluid down through the bit to the bottom of the hole, where the cuttings generated by the bit are picked up and carried to the surface in the space between the bit and the sidewall. The bits of FIGURES 10 and 10A, on the other hand, are intended for use in circumstances such as drilling through broken rock or sloughing of rock into the hole where it may continually envelop the bit and cause it to rotate in loose rock. Such conditions promote abrasion of gage surface 6, and indicate the need for the gage inserts 27 of FIGURE 10 or the gage hardfacing 36 of FIGURE 10A.

Another type of drilling requiring some modification of the bits previously described is the drilling of deeper wells, e.g., water wells. Whereas blast holes are typically only 50 feet deep, water wells must be as deep as 500 feet. In the last stages of such deeper drilling, considerably greater weights are used on the bit, one result of which is a tendency to break the heel inserts. To prevent this result, one or a combination of the following structural variations are used: (1) disposing the heel inserts more nearly horizontal, thus permitting them to receive the load imposed by the resultant of sidewall and bottom forces more nearly in line with their own axes, (2) the supporting lip 2′ illustrated in FIGURE 6, and (3) the non-trailing disposition of FIGURE 11. Comparison of the last figure with FIGURES 1 and 4 reveals that in the FIGURE 1 embodiment the heel inserts 11 trail the inner rows of inserts and in so doing are relieved of some vertical loading because of rock corner 37. In FIGURE 11, the heel inserts 11 cut rock in the same plane with the others and must exert more force in the vertical direction. However, the resultant force, combining such vertical force with the horizontal force exerted by the sidewall, is more nearly aligned with the axis of the insert, thereby reducing the likelihood of breaking off the protruding ends.

An example of the method of manufacturing a successful test bit of the embodiment of FIGURE 1 is as follows:

A large piece of bar stock of high quality 5 percent nickel steel was turned to roughly the finished diameters. Carburizing stock ³⁄₁₆-inch thick was left over the lower surface 3 and side surface 6 in order to keep high percentages of carbon from this area, for it is well known that if the metal proximate the inserts has too great a hardness it is prone to fatigue failure. The lower end of the central air course 18 was similarly protected from carburization for the same reason.

The upper portion of the bit 31 was machined to its finished dimensions by milling the splines 15 and turning the split ring groove 23. The structure was then placed in a furnace where the unprotected surfaces were carburized from .090 to .110 inch case depth with approximately 50 percent surface carbon. After removal from the furnace, the bottom surface 3 was machined to its final dimensions including an outside diameter of 7-inches, a 3° taper on side surface 6A, no taper of surface 6B, and the drilling of the insert holes.

Six air courses 16 were drilled, both the four outside holes and the two inside holes being ⅝-inch diameter, as is generally shown in FIGURE 1. The return flow passageways 21, 22, and 34 were then milled with circular cutters. Slots 26 were milled with a 1¾-inch radius to a depth of ⁵⁄₃₂-inch. Slots 26' were likewise milled with a ¼-inch radius to a depth of ⅛-inch. The structure was hardened by placing it in a furnace with an atmosphere in equilibrium with .10 to .15 percent carbon steel with the carburized area painted with a high temperature paint to prevent decarburization. The structure was then oil quenched from 1430° to 1440° F. and drawn immediately 325° to 335° F., giving the carburized surface area a Rockwell "C" hardness of about 56 and the uncarburized surfaces a hardness of about 38 Rockwell "C."

The insert holes were reamed after heat treatment to remove distortions, and to prepare these surfaces for receiving the inserts. All inserts were of ⁹⁄₁₆-inch diameter, and were pressed into holes having .001 to .0028 inch smaller diameter, the variation resulting from machining tolerances. Insert projection of ⁹⁄₃₂-inch was used, and the flat ends of the inner rows were buried ¹³⁄₃₂-inch below surface 3 while the heel inserts were buried ¹¹⁄₁₆-inch below chamfered surface 9. These dimensions were found to produce satisfactory holding force between the inserts and the body metal. The heel row inserts 11 were inserted to protrude approximately ¹⁄₃₂-inch beyond the outer diameter of side surface 6 in order to provide some initial clearance between the wall of the hole and this side surface. This feature will allow cuttings and fluid to escape in this area, and promote erosive wear of side surface 6, but it has been found by field tests that such protrusion makes relatively little difference if $L_c$ is properly chosen. The inserts were made of medium grain size tungsten carbide particles sintered with cobalt binder constituting 11 percent by weight of the total composition, and had a hardness of 89.5 Rockwell "A."

The advantages of the invention are numerous, but of primary importance is the removal of the expensive requirement of periodic sharpening. The penetration rate is substantially constant even after the inserts are worn flat. The elimination of the wedging problem accompanying wear is another great advantage. The provision of a bottom configuration which maintains efficient removal of the cuttings by promoting high velocity flow across the bottom and erosion of the bit body metal is particularly advantageous.

It should be understood that the forms of the invention herein shown and described are to be taken only as illustrative. Various changes may be made in the size, shape and arrangement of parts. For example, the bit described above was 7 inches in diameter. This invention would probably operate successfully in ranges of diameter from 1½ inches up. Other sizes might require substantial rearrangement of inserts, and placement and size of air courses. The number of inserts in each row can be varied to adapt the invention to drill specific earth formations. Some formations require more inserts and applied force to overcome the compressive strength of the particular rock. The particular angle of inclination of the heel inserts used in the test bits described above varied from 33 degrees from vertical but this angle will also vary with the type formation drilled. (An angle of 45° was found to be appropriate for deep water well drilling.) Considerable variation in the body metal and heat treatment may be necessary for the same reason. The features which enable the bit to drill without wedging are concentrating the wear resistant material at the intersection of the gage and bottom surfaces, avoiding the use of wear resistant material in the gage surface above such intersection by using heel inserts disposed at an angle and not using gage inserts above the heel inserts, and minimizing the gage surface of the steel body which can come into contact with the sidewall of the hole, both initially and after considerable wear, either or both by providing a generous number of slots and grooves in such surface and by recessing such surface inwardly to define a lower portion or step which has a limited axial dimension but nevertheless furnishes adequate support for the heel inserts, such minimum axial length should be about the length of one heel insert, and the gage surface area remaining after providing the grooves and slots should be less than the product of $n$, the number of heel inserts, $d$, the diameter or average cross-sectional dimension of the heel inserts, and D, the bit diameter (with $d$ and D being in the same units, usually inches).

It will be apparent, of course, that the outer peripheral surface of the bit body may be configured in various ways other than that illustrated without departing from the spirit of the invention. Intermediate step 6A may be combined into a single surface with conical surface 24, if desired. The important consideration is to make the maximum diameter lowermost step 6B of sufficient axial length that it furnishes adequate support for heel inserts 11 and to keep the net surface area of this step below a value which will promote wedging.

It will also occur to those skilled in the art that a dual purpose bit may be provided which is capable of adaptation and use for drilling in either of the two basically different conditions previously described: (1) drilling in competent rock formations with no sloughing from above and no other condition compelling the bit to operate while surrounded by cuttings or loose rock, and (2) drilling in broken formations or with sloughing or other conditions which keep the bit surrounded by loose material. As an example, the bit shown in FIGURE 10 could be manufactured without the gage inserts 27 but with the proper holes to receive them already drilled when the bit leaves the plant, the bit otherwise being made with surface 6B being limited in area to avoid wedging when drilling through well consolidated rock. When and if loose rock or other condition tending to rapidly wear gage surface 6B is encountered, gage inserts 27 may be forced into their sockets at the drilling site, as a relatively simple field procedure. A similar but somewhat more complicated procedure would be field hardfacing bands 36 of wear resistant material into previously machined recesses.

In the claims:

1. In a rotary-percussion bit of the type using wear resistant inserts for cutting structure, such inserts having bases at one end and cutting tips opposed thereto, such bit having an upper steel shank adapted for connection to a percussion tool and a lower steel body terminating in a blunt bottom surface and having a circumferential gage surface intersecting said bottom surface, such inserts being disposed with their bases secured in said body and their cutting tips protruding from the bottom surface of said body and distributed in concentric rows in spaced apart relation, the inserts of the outermost or heel row being angularly disposed with their cutting tips protruding at said intersection and their bases secured in the body above and radially inwardly from their cutting tips while the inserts of the inner rows are disposed with their bases generally directly above their cutting tips, *the improvement comprising* said circumferential gage surface having a net area less than the product of the number of heel inserts, the average cross sectional dimension of such heel inserts, and the bit diameter.

2. In a percussion bit generally symmetric about a vertical longitudinal axis and having a metallic body with a generally cylindrical peripheral gage surface and a lower end in the form of a surface extending generally transverse said axis and intersecting said gage surface at a heel, a multiplicity of discrete wear resistant inserts having bases secured in said body and cutting tips protruding from said lower end to define the cutting structure of said bit, said multiplicity of inserts being divided into a group of heel inserts and a group of inner inserts, said inner inserts being disposed inwardly from the heel of the bit body in spaced apart relationship and with their bases lying generally just above their cutting tips, and said heel inserts being disposed in a circumferential row at said heel with their bases in the body upwardly and inwardly from their cutting tips toward said vertical axis, *the improvement comprising* the portions of said heel inserts protruding from the bit body extending radially to be approximately flush with said gage surface and said gage surface containing a number of grooves and slots to limit the net surface area to $ndD$, where $d$ is the average cross sectional dimension of the heel inserts, $n$ is the number of such inserts, and D is the bit diameter.

3. A rotary-percussion bit employing wear resistant inserts for the cutting structure, such inserts comprising compacted pieces of wear resistant material formed with cutting tips at one end and bases at the opposite end, said bit having an upper metal shank portion adapted for engagement with a percussion tool and a lower metal body portion having an axis of rotation and terminating in a lower surface in the form of a surface of revolution symmetric in said axis of rotation, said body portion also having a stepped peripheral surface adapted to confront the borewall of a hole, the lowermost step of said peripheral surface being of maximum diameter and meeting said bottom surface at a heel, said wear resistant inserts being secured in said bit body with their bases buried in said body and surrounded by the metal thereof and with their cutting tips protruding from said bottom surface, a first group of said inserts being disposed inwardly from the heel of the bit body with their bases extending upwardly from their cutting tips generally parallel to said axis of rotation and a second group being disposed with their cutting tips protruding at said heel with their bases extending upwardly and radially inwardly from said cutting tips toward said axis of rotation, said lowermost step containing a number of grooves and slots to limit its area to a value less than $ndD$, where $n$ is the number of heel inserts, $d$ is their average cross-sectional dimension, and D is the bit diameter.

4. In a rotary-percussion bit of the type which is symmetric in a longitudinal axis and comprises an upper shank adapted for engagement with a percussion tool and a lower body terminating in a blunt bottom surface and having a peripheral gage surface meeting said bottom surface at a heel and containing a number of grooves and slots, there being a multiplicity of elongated wear resistant inserts secured in said body with cutting tips protruding from said bottom surface, the outermost of said inserts being disposed at said heel so that their elongated dimensions define acute angles with said longitudinal axis and their secured ends are spaced from both said bottom surface and said gage surface, *the improvement comprising* the protruding cutting tips of said heel inserts extending radially to about said peripheral gage surface and said gage surface extending away from said bottom surface toward said shank, with not more than a slight inward taper, a minimum distance of about one heel insert length to insure body support for said heel inserts and thereafter terminating in a shoulder extending inwardly toward said axis, said peripheral gage surface having a net area less than the product of the number of heel inserts, the average cross-sectional dimension of such inserts, and the bit diameter.

5. A percussion bit having the general form of a cylindrical steel body having an upstanding, smaller diameter shank portion and a lower body portion of larger diameter, said portions being integral and generally symmetric in a longitudinal axis, said body portion having a stepped gage surface and a blunt bottom surface, said bottom surface including an outermost chamfer extending upwardly and outwardly to the lower end of said gage surface, and a multiplicity of wear resistant, elongated inserts having bases secured in said body and cutting tips protruding from said bottom surface, some of said inserts being heel inserts disposed so that their elongated dimensions define acute angles with said longitudinal axis of the bit and their cutting tips protrude from said chamfered part of the bottom surface, said gage surface adjacent said chamfered surface being a step of maximum diameter and extending toward said shank at least one heel insert length to insure adequate metal supporting said heel inserts and terminating in a radially inwardly extending shoulder, said gage surface being provided with a number of slots, grooves and other indentations to limit its net area to a value less than $ndD$, where $n$ is the number of heel inserts, $d$ is the diameter of such inserts, and D is the bit diameter.

6. The rotary-percussion bit of claim 5 in which some of said indentations are adapted to receive wear resistant material prior to the drilling of incompetent or sloughing formations.

7. The bit of claim 1 in which the circumferential spacing of said heel inserts from center to center is equal to or greater than about two insert diameters.

8. The bit of claim 1 in which said bit has fluid delivery passages extending down through said shank and body and terminating in ports in said bottom surface, passageways connecting said bottom surface and said side surface for the flow of flushing fluid to the side surface, and longitudinally extending grooves in said side surface to accommodate upwardly flowing flushing fluid and to limit the net area of said maximum diameter portion subject to abrasive contact with the sidewall of a hole to be drilled.

References Cited by the Examiner
UNITED STATES PATENTS

| | | | |
|---|---|---|---|
| 127,514 | 1/1872 | Ballock | 175—404 |
| 2,097,030 | 10/1937 | Killgore | 175—410 |
| 2,687,875 | 8/1954 | Morlan et al. | 175—410 |
| 2,689,109 | 9/1954 | Curtis | 175—410 |
| 3,071,201 | 1/1963 | Phipps | 175—415 |

JACOB L. NACKENOFF, *Primary Examiner.*

CHARLES E. O'CONNELL, *Examiner.*

J. A. LEPPINK, *Assistant Examiner.*